US012426136B2

(12) United States Patent
Chen et al.

(10) Patent No.: US 12,426,136 B2
(45) Date of Patent: Sep. 23, 2025

(54) COLOR CHANGING LIGHTING ASSEMBLY

(71) Applicant: HKC-US, LLC, Memphis, TN (US)

(72) Inventors: Yupeng Chen, Dongguan (CN); Fengyong Jiang, Dongguan (CN)

(73) Assignee: HKC-US, LLC, Memphis, TN (US)

( * ) Notice: Subject to any disclaimer, the term of this patent is extended or adjusted under 35 U.S.C. 154(b) by 221 days.

(21) Appl. No.: 17/893,809

(22) Filed: Aug. 23, 2022

(65) Prior Publication Data

US 2024/0032165 A1 Jan. 25, 2024

(30) Foreign Application Priority Data

Jul. 19, 2022 (CN) ......................... 202210872310.7

(51) Int. Cl.
*H05B 45/20* (2020.01)
*H05B 45/46* (2020.01)
*H05B 45/50* (2022.01)

(52) U.S. Cl.
CPC ............. *H05B 45/20* (2020.01); *H05B 45/46* (2020.01); *H05B 45/50* (2020.01)

(58) Field of Classification Search
CPC ...... H05B 47/10; H05B 47/155; H05B 45/10; H05B 45/20; H05B 45/30; H05B 45/46; H05B 45/50
See application file for complete search history.

(56) References Cited

U.S. PATENT DOCUMENTS 7,288,902 B1 10/2007 Melanson
8,207,821 B2 6/2012 Roberge et al.
8,710,754 B2 4/2014 Baddela et al.
9,854,640 B2 12/2017 Hsia
10,091,855 B2 10/2018 Van Winkle
10,154,564 B2 12/2018 Chen
10,260,683 B2 4/2019 Bergman et al.
10,278,251 B1 4/2019 Fledderman et al.
(Continued)

FOREIGN PATENT DOCUMENTS

CN 117460111 A 1/2024
JP 2013254568 A * 12/2013
KR 2007049735 A * 5/2007 ......... H05B 33/0815

OTHER PUBLICATIONS

Malik, Rajib & Ray, Kalyan & Mazumdar, Saswati. (2017). Wide range, Open-loop, CCT and Illuminance Control of an LED Lamp using Two-component Colour Blending. IEEE Transactions on Power Electronics. pp. 1-1. 10.1109/TPEL.2017.2785684.
(Continued)

*Primary Examiner* — Jimmy T Vu
(74) *Attorney, Agent, or Firm* — Jon E. Holland; Butler Snow LLP

(57) ABSTRACT

A circuit for a lighting assembly includes a power supply, a first light source connected with an output of the power supply, and a second light source connected with the output of the power. The first and second light sources are connected with the output of the power supply in parallel. At least one integrated chip including a driver is configured to regulate the current to each of the first light source and the second light source. A switch is configured to select a brightness level of each of the first and second light sources configured to appear similar to the characteristics of a halogen or incandescent light source.

17 Claims, 8 Drawing Sheets

(56) References Cited

U.S. PATENT DOCUMENTS

| | | | | |
|---|---|---|---|---|
| 10,299,321 | B1 | 5/2019 | Trask et al. | |
| 10,455,661 | B2 | 10/2019 | Harada et al. | |
| 10,568,180 | B2 | 2/2020 | Murray et al. | |
| 10,667,367 | B2 | 5/2020 | Chen | |
| 10,721,801 | B1 | 7/2020 | Price et al. | |
| 10,750,592 | B1 | 8/2020 | Price et al. | |
| 10,757,783 | B2 | 8/2020 | Miskin et al. | |
| 11,153,946 | B2 | 10/2021 | Zhou | |
| 11,976,802 | B2 | 5/2024 | LaVigna et al. | |
| 2007/0029946 | A1 | 2/2007 | Yu et al. | |
| 2011/0309746 | A1 | 12/2011 | Eckel et al. | |
| 2013/0300305 | A1 | 11/2013 | Wray | |
| 2013/0334980 | A1 * | 12/2013 | Zhou | H05B 47/185 315/250 |
| 2014/0035472 | A1 | 2/2014 | Raj et al. | |
| 2014/0159595 | A1 * | 6/2014 | Sutardja | H05B 45/24 315/192 |
| 2015/0009666 | A1 | 1/2015 | Keng et al. | |
| 2015/0257211 | A1 | 9/2015 | Johnson et al. | |
| 2015/0296577 | A1 | 10/2015 | Chen | |
| 2017/0105265 | A1 | 4/2017 | Sadwick | |
| 2018/0233030 | A1 | 8/2018 | Knapp et al. | |
| 2018/0376555 | A1 | 12/2018 | Wang | |
| 2019/0150239 | A1 * | 5/2019 | Miskin | H05B 45/42 315/185 R |
| 2019/0297704 | A1 | 9/2019 | van de Ven et al. | |
| 2019/0364645 | A1 | 11/2019 | Chen | |
| 2019/0371768 | A1 * | 12/2019 | You | H01L 33/56 |
| 2020/0022236 | A1 | 1/2020 | Eisele et al. | |
| 2020/0067343 | A1 | 2/2020 | Chen | |
| 2020/0248898 | A1 | 8/2020 | Chen | |

OTHER PUBLICATIONS

Malik, R., Ray, K., & Mazumdar, S. (2019). A Low-Cost, Wide-Range, CCT-Tunable, Variable-Illuminance LED Lighting System. LEUKOS, 16(2), 157-176.

* cited by examiner

COLOR CHANGING LIGHTING ASSEMBLY

CROSS-REFERENCE TO RELATED APPLICATION

This application claims priority to Chinese Application No. 202210872310.7 to Yupeng Chen et al. filed on Jul. 19, 2022, the contents of which are incorporated herein by reference in its entirety.

FIELD

The present subject matter generally relates to a color changing lighting assembly, specifically a color changing lighting assembly configured to produce various wavelengths of light via two or more light sources.

BACKGROUND

It is often desired to selectively dim lights, particularly in residential and commercial settings. When a halogen or incandescent bulb is dimmed, the color temperature of the light changes to be warmer shade (e.g. 3100K to 1850K). However, when an LED is dimmed by an external dimmer, the dimming does not affect the color temperature of the LED. Therefore, dimming an LED does not produce the same warming effect that dimming a halogen or incandescent bulb produces.

BRIEF DESCRIPTION

Aspects and advantages of the invention will be set forth in part in the following description, or may be obvious from the description, or may be learned through practice of the invention.

According to some aspects of the present disclosure, a circuit for a lighting assembly includes a power supply, a first light source connected with an output of the power supply, and a second light source connected with the output of the power. The first and second light sources are connected with the output of the same power supply in parallel. At least one integrated chip including an internal driver is configured to regulate the variable current to each of the first light source and the second light source. A switch is configured to select a brightness level of each of the first and second light sources.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
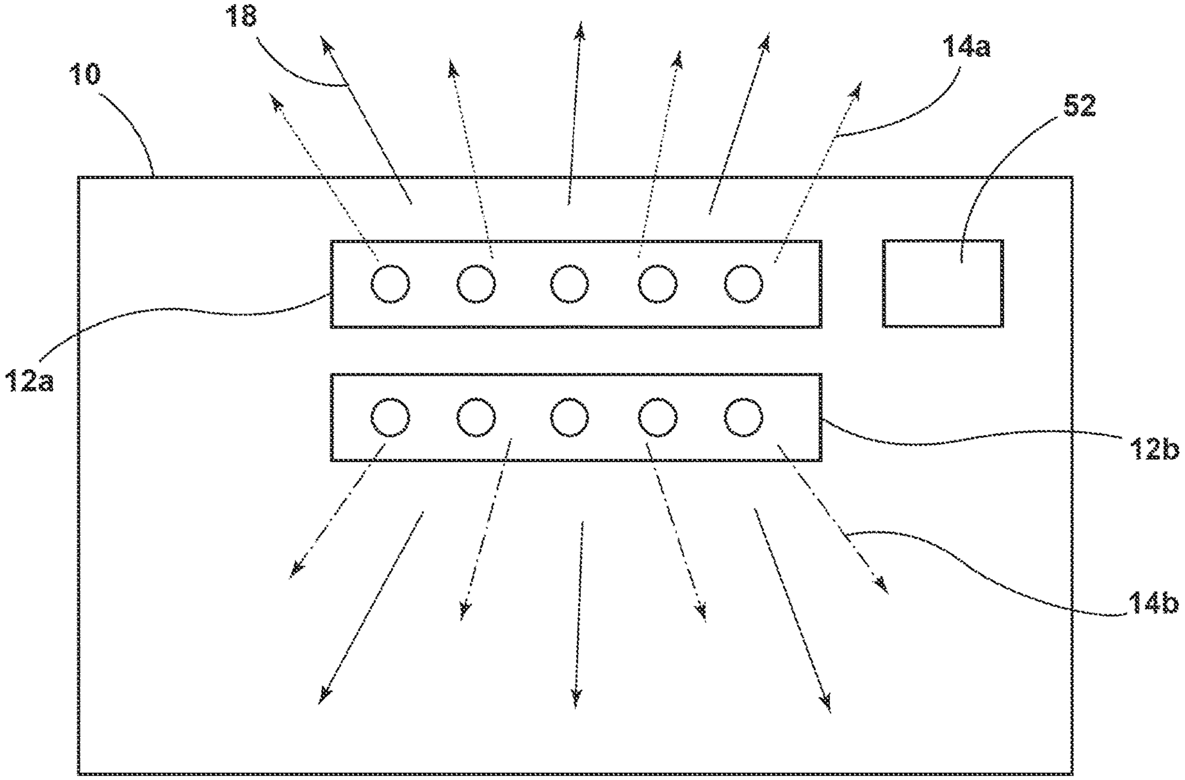
FIG. 1 is a schematic diagram of a lighting assembly including one or more light sources, according to various examples.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Referring now to FIG. 1, the present disclosure is generally directed to a lighting assembly 10 including a first light source 12*a* and a second light source 12*b*. The first light source 12*a* is configured to produce a first light 14*a*, and the second light source 12*b* is configured to produce a second light 14*b*. The first and second light sources 12*a*, 12*b* may be illuminated independently or simultaneously, as discussed in more detail elsewhere herein. In various examples, each of the first and second light sources 12*a*, 12*b* is configured as a light-emitting diode (LED). In other examples, one or both of the first and second light sources 12*a*, 12*b* may be a plurality of LEDs (e.g., an LED string) configured to illuminate as a single unit. In still other examples, any other operable light source 12*a*, 12*b* may be used without departing from the scope of the present disclosure.

Figure 2:
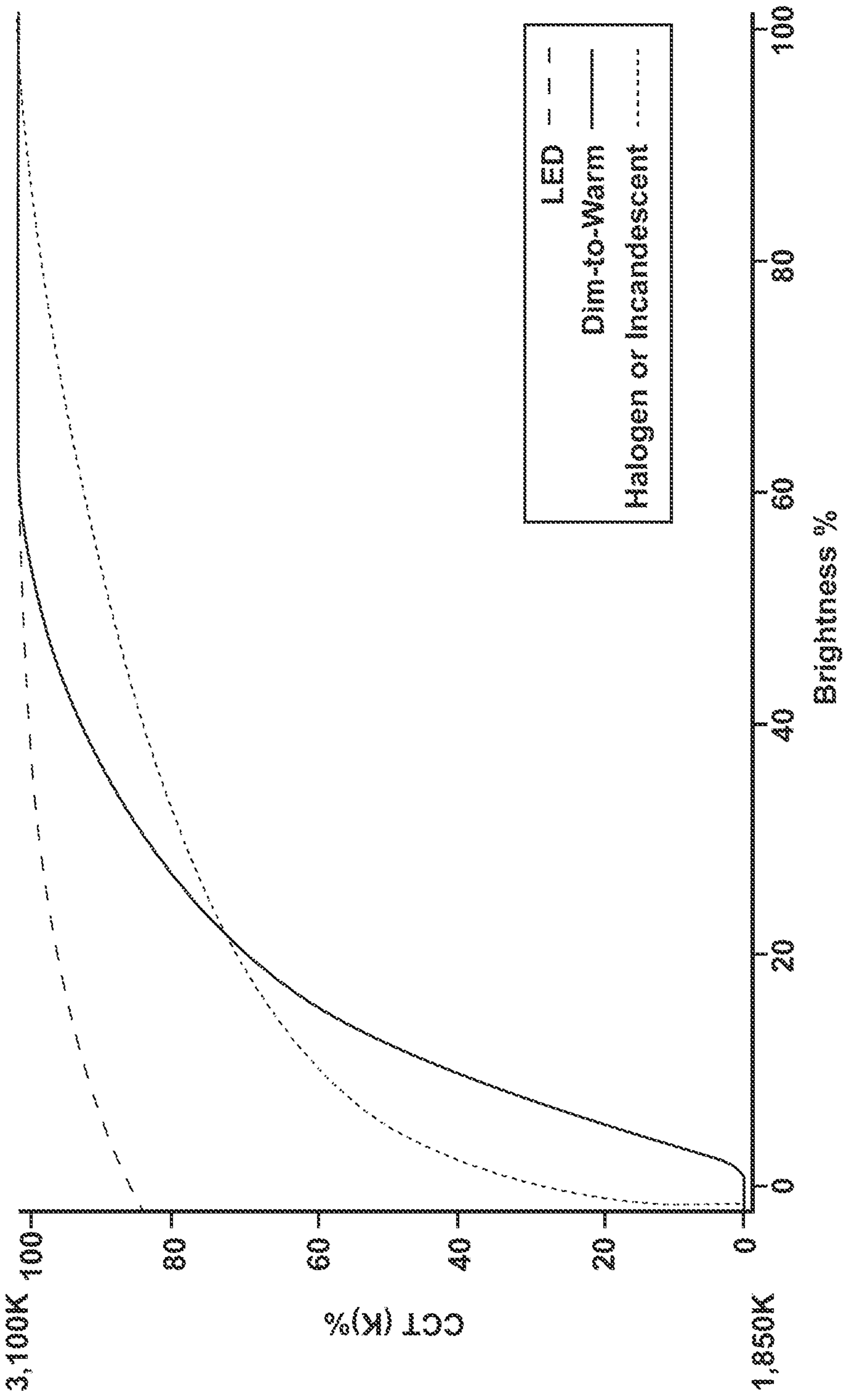
FIG. 2 is a graphical representation of Correlated Color Temperature as it relates to brightness for the lighting assembly and/or the light sources of FIG. 1 (i.e., the warm on dim lighting assembly) compared to a halogen or incandescent light source, according to various examples.

FIG. 2 illustrates a graphical representation of Correlated Color Temperatures if a halogen or incandescent light source compared with the disclosed LED light sources 12*a*, 12*b* of the lighting assembly 10 (labeled "Warm on Dim"). Referring now to FIGS. 1 and 2, the first light source 12*a* is configured as a "cold LED" such that the first light 14*a* has a Correlated Color Temperature (CCT) within a range of about 3000 Kelvin degrees (K) and about 4000K. It will be understood that the first light 14*a* may have a CCT of any value or subset of values within this range of values without departing from the scope of the present disclosure. For example, the first light 14*a* may have a CCT of about 3100K. The second light source 12*b* is configured as a "warm LED" such that the second light 14*b* has a CCT within a range of about 1500K to about 3000K. It will be understood that the second light 14*b* may have a CCT of any value or subset of values within this range of values without departing from the scope of the present disclosure. For example, the second light 14*b* may have a CCT of about 1850K. The first and second light sources 12*a*, 12*b* are configured to be adjustable to produce a combined light 18 that can be adjusted to have one or more CCTs within a range of about 1500K to about 3500K. For example, the first and second light sources 12*a*, 12*b* may configured to produce the combined light 18 to be adjusted so that the CCT ranges between about 1850K and about 3100K, similar to a halogen or incandescent light source.

Figure 3A:
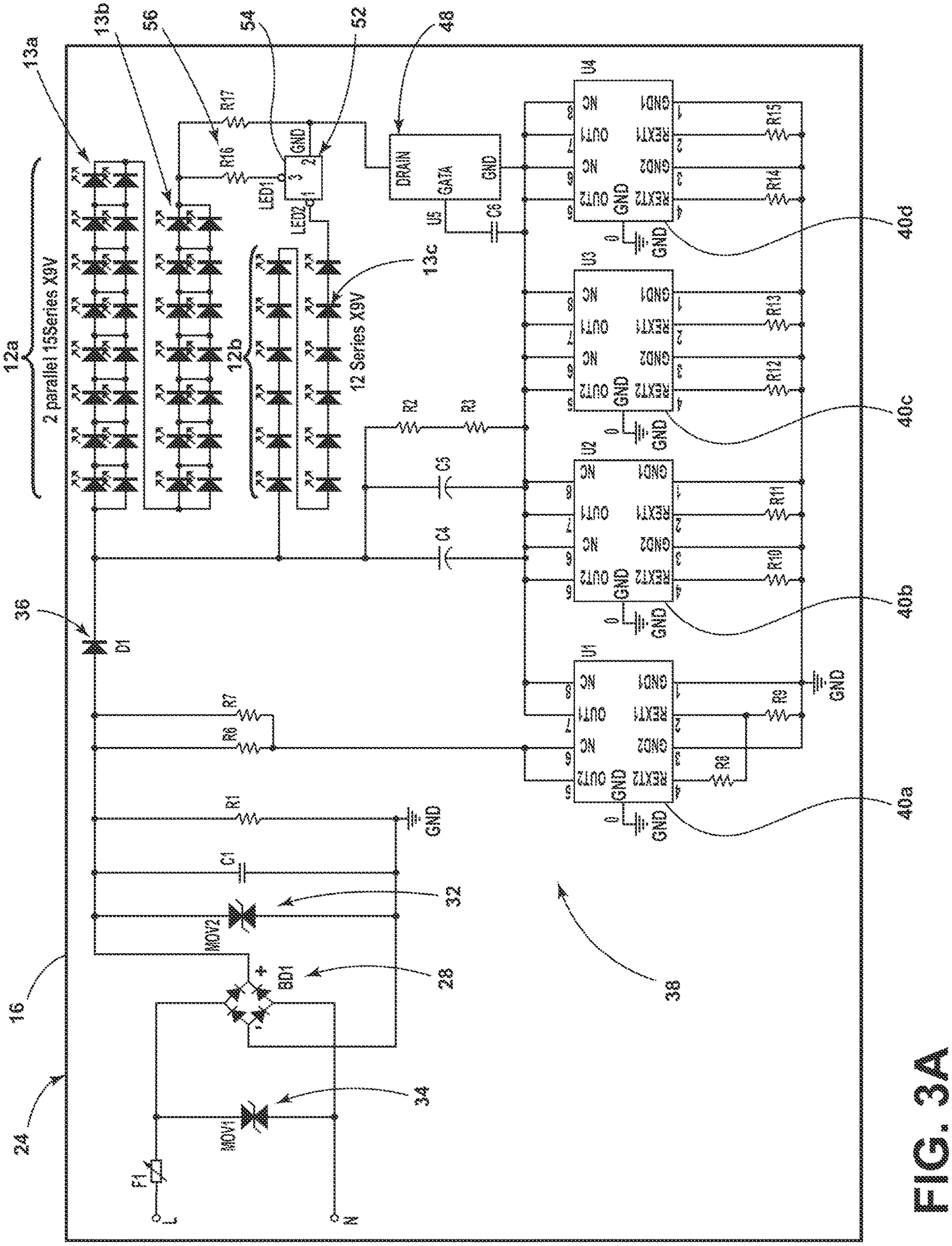
FIG. 3A is a schematic diagram of a circuit of the lighting assembly of FIG. 1, according to various examples.
Figure 3B:
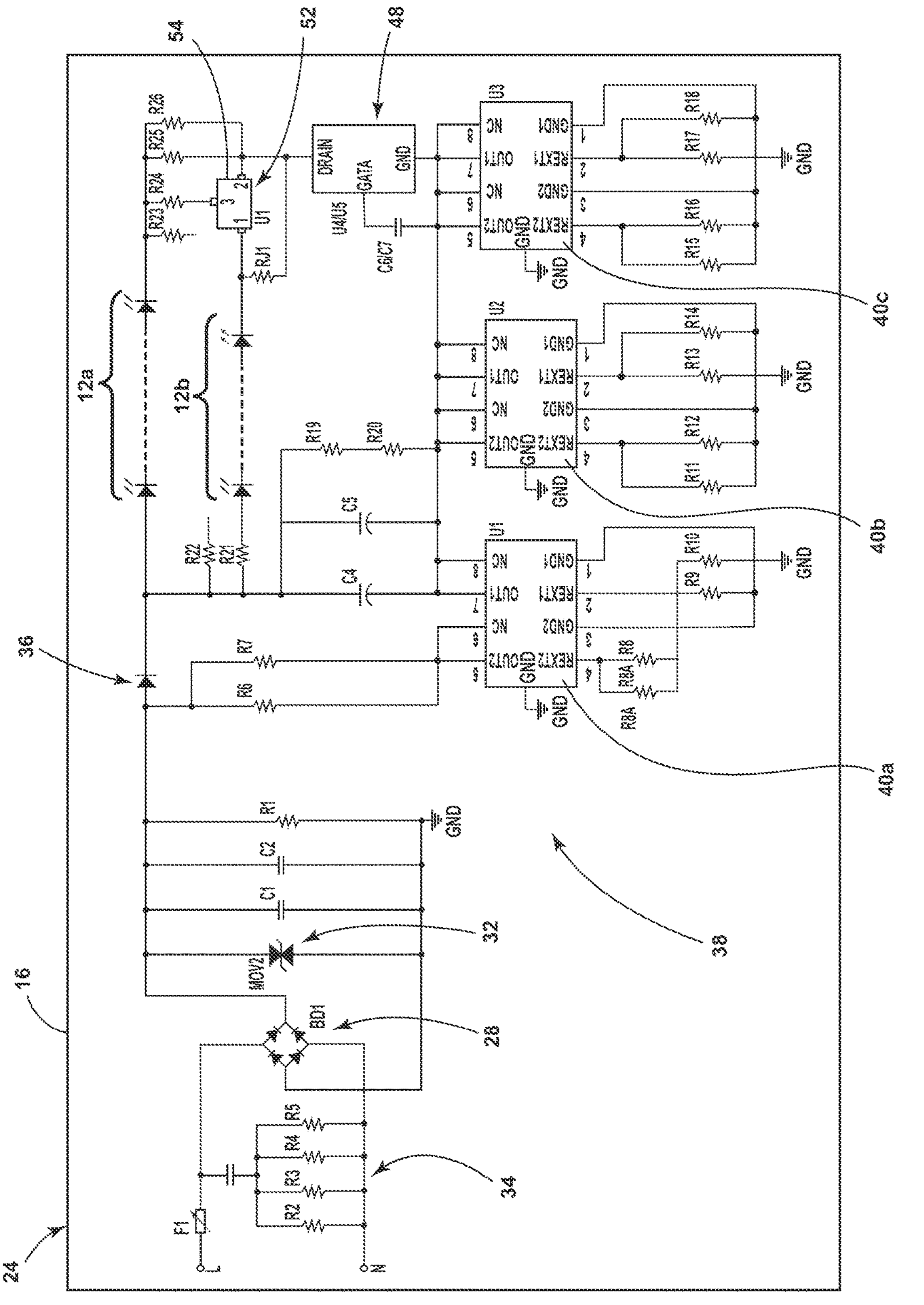
FIG. 3B is a schematic diagram of a circuit of the lighting assembly of FIG. 1, according to various examples.
Figure 3C:
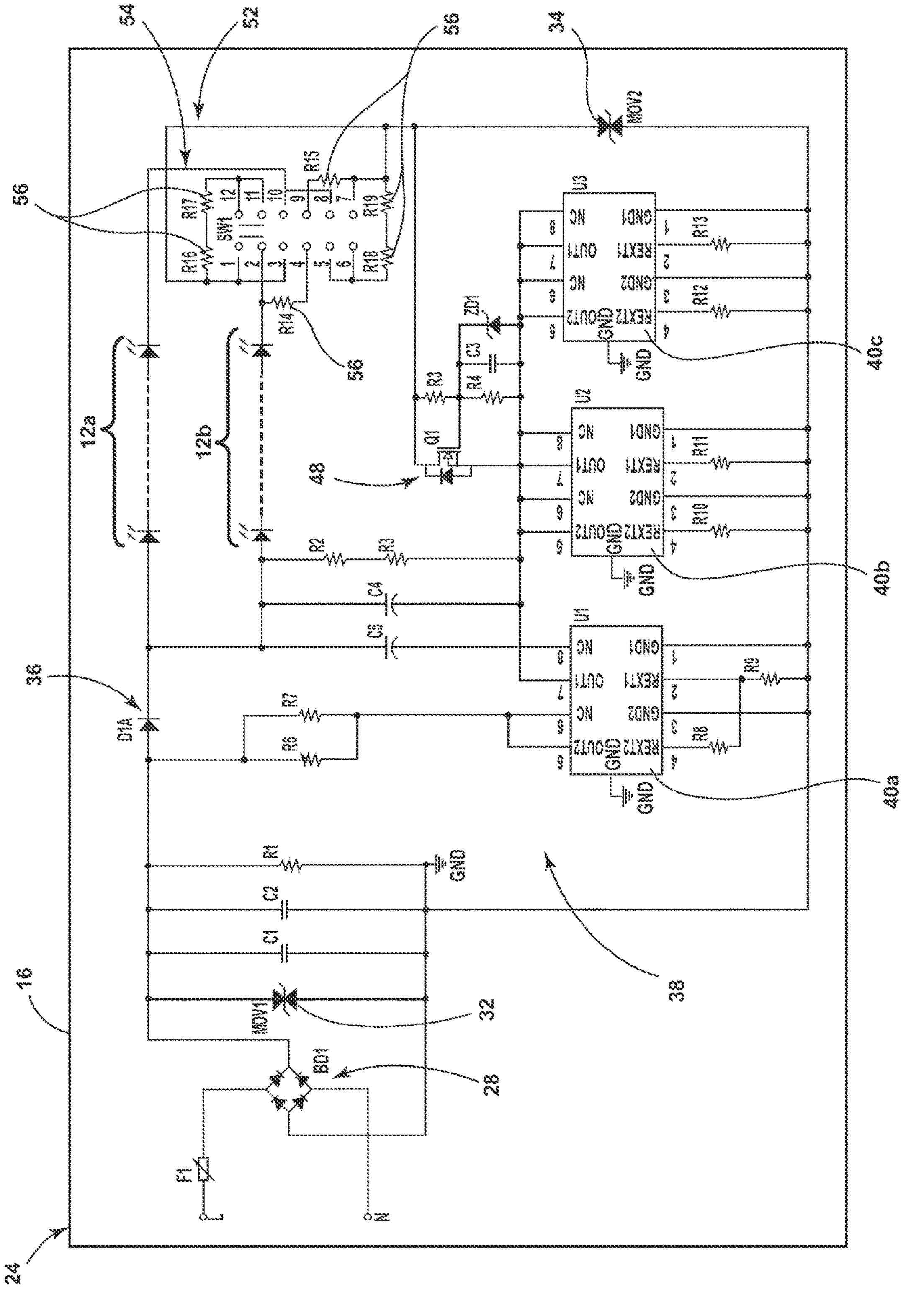
FIG. 3C is a schematic diagram of a circuit of the lighting assembly of FIG. 1, according to various examples.
Figure 4:
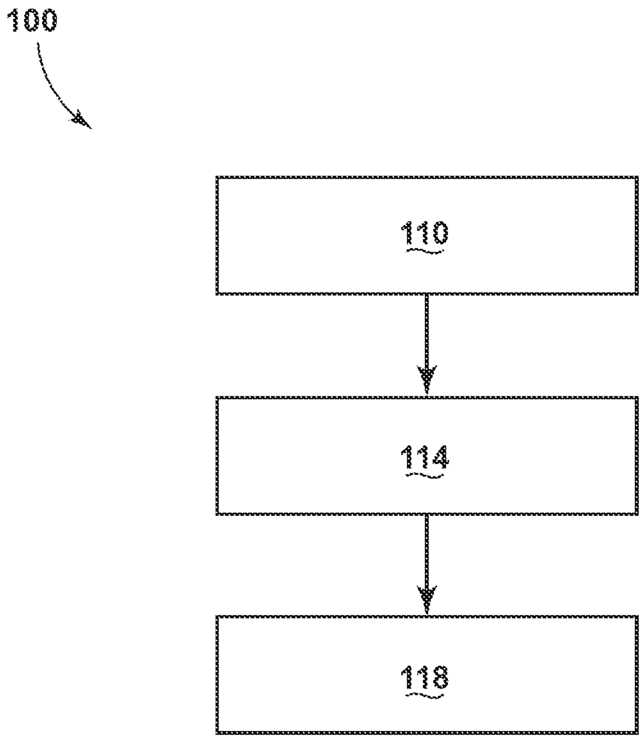
FIG. 4 is a flow diagram of a first method of operating a lighting assembly, according to various examples.
Figure 5:
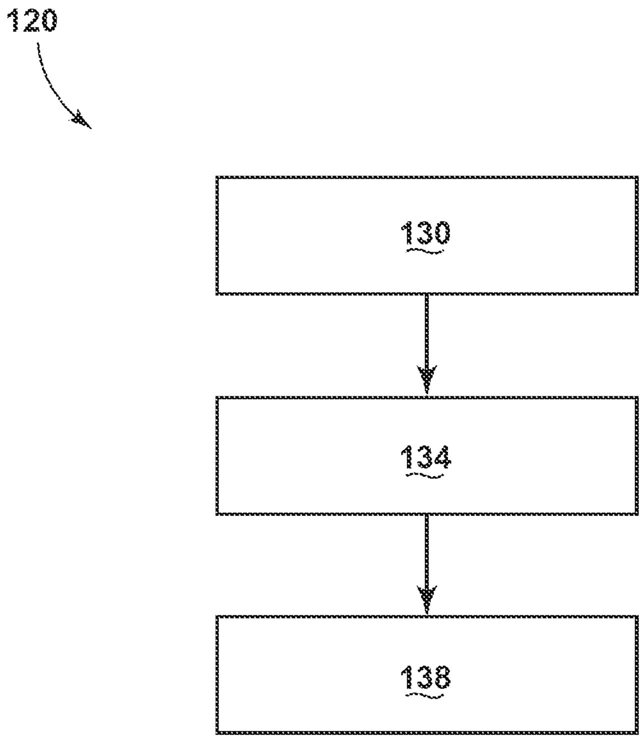
FIG. 5 is a flow diagram of a second method of operating a lighting assembly, according to various examples.
Figure 6:
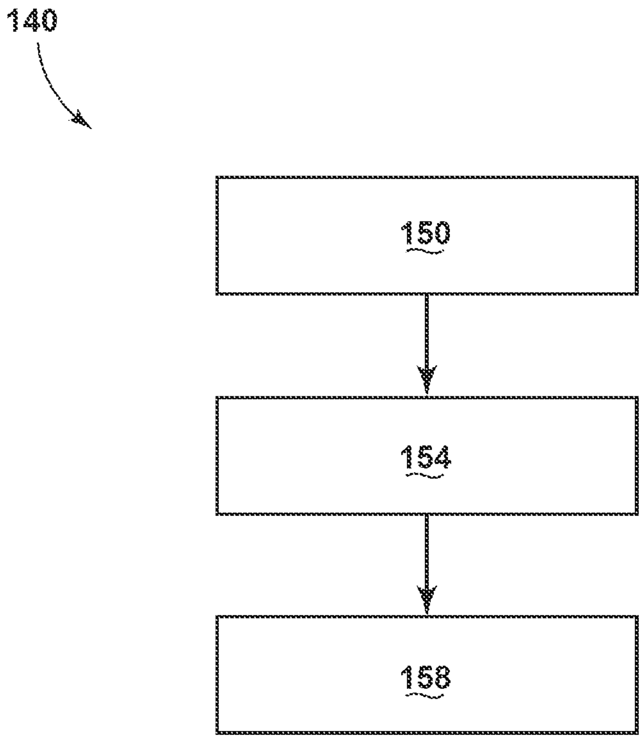
FIG. 6 is a flow diagram of a third method of operating a lighting assembly, according to various examples.

FIGS. 3A-3C illustrate various configurations for a lighting circuit 24. In each of the configurations, the lighting assembly 10 includes a printed circuit board (PCB) 16 configured to support the lighting circuit 24 for operating the first and second light sources 12*a*, 12*b*.

As shown in FIGS. 3A-3C, the lighting circuit 24 may include a diode bridge 28 configured to convert AC power to DC power. The diode bridge 28 is configured to act as a DC power supply. In various examples, a first surge protector 32 may be electrically coupled with the output of the diode bridge 28. A second surge protector 34 may be electrically coupled with the input of the diode bridge 28. As shown in FIG. 3C, the second surge protector 34 may be formed of one or more resistors and one or more capacitors. In other examples, only the first surge protector 32 may be used. In still other examples, one or more surge protectors 32 may be located in other locations within the light circuit 24.

The first light source 12*a* is electrically coupled with the output of the diode bridge 28. A diode 36 may be positioned between the diode bridge 28 and the first light source 12*a*. As shown in FIG. 3A, the first light source 12*a* may include a first series of LEDs 13*a* connected in parallel with a second series of LEDs 13*b*. In various examples, the first and second series of LEDs 13*a*, 13*b* may be configured to selectively receive current as a single light source (i.e., the first light source 12*a*). For example, the first and second series of LEDs 13*a*, 13*b* may be two parallel 15 units of series LEDs. However, it is contemplated that other LED combinations may be used.

The second light source 12*b* is electrically coupled with the output of the diode bridge 28 such that the first and second light sources 12*a*, 12*b* are in parallel. As shown in FIG. 3A, the first light source 12*b* may include a third series of LEDs 13*c* configured to receive current as a single light source (i.e., the second light source 12*b*). As illustrated, the third series of LEDs 13*c* may be 12 units of series LEDs. In other examples, the third series of LEDs 13*c* may be two parallel 15 units of series LEDs.

Referring again to FIGS. 3A-3C, a plurality of integrated circuits 38 may be coupled with the PCB 16. Each of the plurality of integrated circuits 38 may be electrically coupled with the output of the diode bridge 28 and the first and second light sources 12*a*, 12*b*. For example, as illustrated in FIG. 3A, the plurality of integrated circuits 38 may include four constant-current control integrated circuits 40*a*, 40*b*, 40*c*, 40*d*. Each of the four constant-current control integrated circuits 40*a*, 40*b*, 40*c*, 40*d* may be electrically coupled in parallel and may be configured to regulate current to each of the first and second light source 12*a*, 12*b*. In other examples, as shown in FIGS. 3B and 3C, three constant-current control integrated circuits 40*a*, 40*b*, 40*c* may be used. It is contemplated that any number of constant-current control integrated circuits may be used without departing from the scope of the present disclosure.

In various examples, each of the integrated circuits 40*a*, 40*b*, 40*c*, 40*d* may include an integrated FET driver. These constant-current control integrated circuits 40*a*, 40*b*, 40*c* may be configured to provide the requisite power for the first and second light sources 12*a*, 12*b*. For example, each integrated circuit 40*a*, 40*b*, 40*c* may be a JW19819 manufactured by Joulwatt, a WS 9621 manufactured by Winsemi, or any other comparable integrated circuit with an integrated FET driver.

In various examples, the integrated circuits 40*a*, 40*b*, 40*c* may be configured to operate in tandem to control current to one or both of the first and second light sources 12*a*, 12*b*. In other examples, each light sources 12*a*, 12*b* is operated by a separate integrated circuit 40*a* and respective driver. In other words, one of the integrated circuits 40*a*, 40*b*, 40*c* may be configured to control current to the first light source 12*a*, and another of the integrated circuits 40*a*, 40*b*, 40*c* may be configured to control current to the second light source 12*b*. It is contemplated that any combination of the integrated circuits 40*a*, 40*b*, 40*c* may be used to control one or both of the first and second light sources 12*a*, 12*b* without departing from the scope of the present disclosure.

Referring again to FIGS. 3A-3C, the lighting circuit 24 may further include a transistor 48 operably coupled with the PCB 16. The transistor 48 may be operably coupled with one or more of the integrated circuits 40*a*, 40*b*, 40*c*. The transistor 48 is configured to reduce light fluctuations when the lighting circuit 24 is powered. In various examples, as shown in FIG. 3B, the transistor 48 may be a depletion MOSFET configured to act as a regulated switch.

Referring now to FIGS. 1-3C, a switch 52 is coupled with the PCB 16 and electrically coupled with each of the first and second light sources 12*a*, 12*b*. The switch 52 is configured to select the brightness of the combined light 18 produced by the lighting assembly 10 shown in FIGS. 3A-3C and, subsequently, adjusts the CCT of the combined light 18. As shown in FIG. 2, when the brightness of the combined light 18 is increased, the CCT of the combined light 18 also increases. To control the brightness and the CCT of the combined light 18, the switch 52 is configured to individually select the level of brightness of each of the first and second light sources 12*a*, 12*b* as a dimming cycle is initiated. The switch 52 may be configured as any type of external switching device including but not limited to a remote control, a rheostat, a slide switch, a digital dimmer, etc. It will also be understood that any number of switches may be used together or separately to generate various lighting configurations without departing from the scope of the present disclosure.

As shown in FIG. 3A-3C, the switch 52 may include a separate integrated circuit 54. The range of CCT as related to the brightness level of the combined light 18 (FIG. 1) is set by the configuration of the integrated circuit during manufacturing and may be adjusted to end user specifications. In various examples, a plurality of resistors 56 may be coupled with the switch 52 and may be configured to provide variable resistance to provide varying levels of brightness in each of the first and second light sources 12*a*, 12*b*. It will be understood that any integrated circuit may be used that is configurable to operate as a programmable switch as described without departing from the scope of the present disclosure.

Referring again to FIGS. 1-3C, in operation, an electrical input is provided from a power source to the diode bridge 28. The power is converted from AC power to DC power as it passes through the diode bridge 28. One or more surge protectors (e.g., the first and/or second surge protectors 32, 34) are positioned to prevent a power surge before the diode bridge 28 and/or after the diode bridge 28. A user operates the switch 52 to select a specific brightness for the lighting assembly 10. The switch 52 communicates with the plurality of integrated circuits 38 what level of brightness should be provided for each of the first light source 12*a* and the second light source 12*b*. Power is then supplied to each of the first and second light sources 12*a*, 12*b* to maintain the desired CCT for the selected brightness level. The regulation of the power to each of the first and second light sources 12*a*, 12*b* is controlled by the plurality of integrated circuits 38.

The switch 52 may operate using one or more methods 100, 120, 130, as described below. As shown in FIGS. 1-4, a first method 100 of operating a lighting assembly 10 to produce a warm on dim lighting effect includes a step 110 of reducing a first current to a first light source 12*a* at a rate of reduction. The first light source 12*a* is a cool LED, as described elsewhere herein. The method 100 further includes a step 114 of increasing a second current to a second light source 12*b* at a rate of increase, wherein the rate of reduction of current to the first light source 12*a* is greater than the rate of increase of current to the second light sources 12*b*. The second light source 12*b* is a warm LED, as described elsewhere herein. The method 100 includes another step 118 of reducing the first current and increasing the second current until a predetermined dimming cycle is complete.

As shown in FIGS. 1-3 and 5, a second method 120 of operating a lighting assembly 10 to produce a warm on dim lighting effect includes a step 130 reducing a first current to a first light source 12*a* at a first rate of reduction. The first light source 12*a* is a cool LED, as described elsewhere herein. The method 120 further includes a step 134 of reducing a second current to a second light source 12*b* at a second rate of reduction, wherein the first rate of reduction is greater than the second rate of reduction. The second light source 12*b* is a warm LED, as described elsewhere herein. The method 120 includes another step 138 of reducing the first and second currents until a predetermined dimming cycle is complete.

As shown in FIGS. 1-3 and 6, a third method 140 of operating a lighting assembly 10 to produce a warm on dim lighting effect includes a step 150 reducing a first current to a first light source 12*a* at a rate of reduction and a step of reducing a second light source 12*b* at the rate of reduction. The first light source 12*a* is a cool LED, and the second light source 12*b* is a warm LED, as described elsewhere herein. The method 140 further includes a step 154 of halting the reduction of the second current when the first and second currents result in a dimming level of about 60%. Another step 158 includes continuing to reduce the first current at the first rate of reduction until a predetermined dimming cycle is complete. It will be understood that the methods 100, 120, 140 are examples of by step reduction and that any number of steps can be used in connection with any one of the methods to create stepless dimming of the lighting assembly 10 through adjustment of the first and second light sources 12*a*, 12*b* until a desired brightness level for the combined light 18 is reached.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A circuit for a lighting assembly comprising:

a power supply;

a first light source connected with an output of the power supply;

a second light source connected with the output of the power supply, wherein the first and second light sources are connected with the output of the power supply in parallel;

at least one integrated circuit including a driver, wherein the at least one integrated circuit is configured to regulate current to each of the first light source and the second light source; and a switch configured to select a brightness level of each of the first and second light sources, wherein the at least one integrated circuit, in regulating the current to each of the first light source and the second light source, is configured to:

reduce a first current to the first light source at a rate of reduction;

increase a second current to the second light source at a rate of increase, wherein the rate of reduction is greater than the rate of increase; and reduce the first current and increase the second current until a predetermined dimming cycle is complete.

2. The circuit of claim 1, wherein the first light source is a first series of light emitting diodes and the second light source is a second series of light emitting diodes.

3. The circuit of claim 1, wherein the first light source is a two series of light emitting diodes in parallel and the second light source is a single series of light emitting diodes.

4. The circuit of claim 1, wherein the first light source is configured to produce a first light having a Correlated Color Temperature from about 3000 Kelvin degrees to about 4000 Kelvin degrees, and the second light source is configured to produce a second light having a Correlated Color Temperature from about 1500 Kelvin degrees to about 3000 Kelvin degrees.

5. The circuit of claim 1, wherein the at least one integrated circuit is a plurality of circuits each having an integrated internal driver.

6. The circuit of claim 5, wherein one of the plurality of circuits is configured to regulate the first current to the first light source and another of the plurality of circuits is configured to regulate the second current to the second light source.

7. The circuit of claim 1, wherein the switch includes a switch integrated circuit electrically coupled with one or more resistors.

8. The circuit of claim 1, wherein the switch is configured to determine a corresponding Correlated Color Temperature for the selected brightness level and the at least one integrated circuit is configured to provide the first current and the second current to achieve the selected brightness level and the corresponding Correlated Color Temperature.

9. The circuit of claim 1, further comprising:
- a transistor configured to reduce fluctuations in illumination of the first and second light sources.

10. The circuit of claim 1, further comprising:
- a diode bridge configured to convert power from the power supply to DC power; and
- one or more surge protectors electrically coupled with the diode bridge.

11. A method of controlling a lighting assembly, comprising:
- providing electrical input from a power source to a diode bridge;
- programming a switch integrated circuit to receive input and determine a corresponding Correlated Color Temperature for the lighting assembly, wherein the input is a selected brightness level;
- programming one or more control integrated circuits to receive input from the switch integrated circuit; and
- regulating current to first and second light sources via the one or more control integrated circuits to illuminate the first and second light sources simultaneously in response to the input from the switch integrated circuit to achieve the selected brightness level and the corresponding Correlated Color Temperature, wherein regulating current to first and second light sources via the one or more control integrated circuits includes:
- reducing a first current to the first light source at a rate of reduction;
- increasing a second current to the second light source at a rate of increase, wherein the rate of reduction is greater than the rate of increase; and
- reducing the first current and increasing the second current until a predetermined dimming cycle is complete.

12. A method of controlling a lighting assembly, comprising:
- providing electrical input from a power source to a diode bridge;
- programming a switch integrated circuit to receive input and determine a corresponding Correlated Color Temperature for the lighting assembly, wherein the input is a selected brightness level;
- programming one or more control integrated circuits to receive input from the switch integrated circuit; and
- regulating current to first and second light sources via the one or more control integrated circuits to illuminate the first and second light sources simultaneously in response to the input from the switch integrated circuit to achieve the selected brightness level and the corresponding Correlated Color Temperature, wherein regulating current to first and second light sources via the one or more control integrated circuits includes:
- reducing a first current to the first light source at a first rate of reduction;
- reducing a second current to the second light source at a second rate of reduction, wherein the first rate of reduction is greater than the second rate of reduction; and
- reducing the first and second currents until a predetermined dimming cycle is complete.

13. A method of controlling a lighting assembly, comprising:
- providing electrical input from a power source to a diode bridge;
- programming a switch integrated circuit to receive input and determine a corresponding Correlated Color Temperature for the lighting assembly, wherein the input is a selected brightness level;
- programming one or more control integrated circuits to receive input from the switch integrated circuit; and
- regulating current to first and second light sources via the one or more control integrated circuits to illuminate the first and second light sources simultaneously in response to the input from the switch integrated circuit to achieve the selected brightness level and the corresponding Correlated Color Temperature, wherein regulating current to first and second light sources via the one or more control integrated circuits includes:
- reducing a first current to the first light source at a rate of reduction;
- reducing a second current to the second light source at the rate of reduction; and
- halting the reduction of the second current when the first and second currents result in a selected dimming level.

14. The method of controlling a lighting assembly of claim 13, wherein regulating current to first and second light sources via the one or more control integrated circuits further includes:
- continuing reduction of the first current until a predetermined dimming cycle is complete.

15. The method of controlling a light assembly of claim 13, wherein the selected dimming level is about sixty percent of the full illumination of the second light source.

16. A circuit for a lighting assembly comprising:
- a power supply;
- a first light source connected with an output of the power supply;
- a second light source connected with the output of the power supply, wherein the first and second light sources are connected with the output of the power supply in parallel;

at least one integrated circuit including a driver, wherein the at least one integrated circuit is configured to regulate current to each of the first light source and the second light source; and a switch configured to select a brightness level of each of the first and second light sources, wherein the at least one integrated circuit, in regulating the current to each of the first light source and the second light source, is configured to:

reduce a first current to the first light source at a first rate of reduction;

reduce a second current to the second light source at a second rate of reduction, wherein the first rate of reduction is greater than the second rate of reduction; and reduce the first and second currents until a predetermined dimming cycle is complete.

17. A circuit for a lighting assembly comprising:

a power supply;

a first light source connected with an output of the power supply;

a second light source connected with the output of the power supply, wherein the first and second light sources are connected with the output of the power supply in parallel;

at least one integrated circuit including a driver, wherein the at least one integrated circuit is configured to regulate current to each of the first light source and the second light source; and a switch configured to select a brightness level of each of the first and second light sources, wherein the at least one integrated circuit, in regulating the current to each of the first light source and the second light source, is configured to:

reduce a first current to the first light source at a rate of reduction;

reduce a second current to the second light source at the rate of reduction; and halt the reduction of the second current when the first and second currents result in a selected dimming level.

* * * * *